United States Patent [19]

Gisser

[11] Patent Number: 5,002,338
[45] Date of Patent: Mar. 26, 1991

[54] CHILD RESTRAINT

[75] Inventor: Marshall Gisser, 601 Jarvis Ave., Far Rockaway, N.Y. 11691

[73] Assignee: Marshall Gisser, Far Rockaway, N.Y.

[21] Appl. No.: 472,833

[22] Filed: Jan. 31, 1990

[51] Int. Cl.[5] ............................................. A47D 1/10
[52] U.S. Cl. ................................... 297/250; 297/216; 297/464
[58] Field of Search ............... 297/250, 464, 465, 466, 297/467, 216; 5/94

[56] References Cited

U.S. PATENT DOCUMENTS

| | | | |
|---|---|---|---|
| 4,108,489 | 8/1978 | Salzman | 297/250 X |
| 4,164,357 | 8/1979 | Conachey | 297/250 |
| 4,402,548 | 9/1983 | Mason | 297/250 X |
| 4,583,253 | 4/1986 | Hall | 297/250 X |
| 4,681,368 | 7/1987 | Heath et al. | 297/216 X |
| 4,790,593 | 12/1988 | Davalos | 297/250 |
| 4,804,230 | 2/1989 | Friedman | 297/250 X |

Primary Examiner—Peter A. Aschenbrenner
Attorney, Agent, or Firm—Helfgott & Karas

[57] ABSTRACT

A child restraint includes a support with a harness for securing a child to the support. The support is formed of two portions, a base and a flap, which are hinged together and which are locked in a planar configuration supporting the child, but are folded over for carrying and storing the restraint. The restraint is constructed further with a set of three wing panels extending from the base and another two wing panels extending from the flap, all the wings being connected by hinges and being locked in a common plane for supporting the child on a person's lap. The wing panels can be locked also in forwardly extending positions wherein the wing panels serve as walls surrounding the child to provide protection in vehicular travel, particularly during sudden deceleration and possible crash situations. A strap is securable to the base in either a longitudinal or transverse direction of the restraint, the longitudinal direction serving to secure the restraint to a person's lap for holding the child, while the transverse direction is employed for securing the restraint with a front surface thereof facing a seat back. The wing panels of the base are folded towards the base to provide a compact configuration of the restraint for storage.

19 Claims, 3 Drawing Sheets

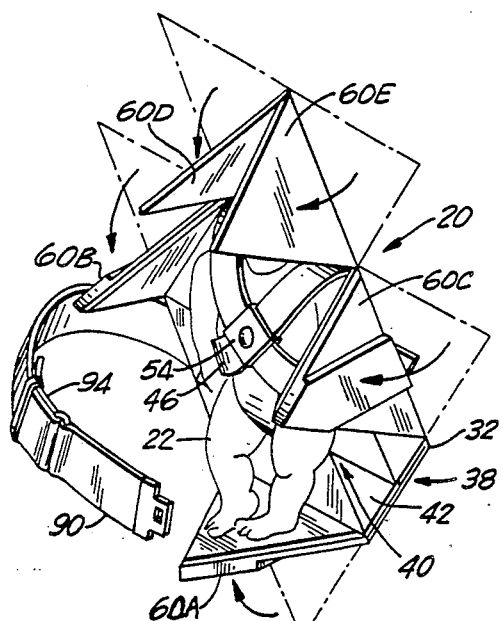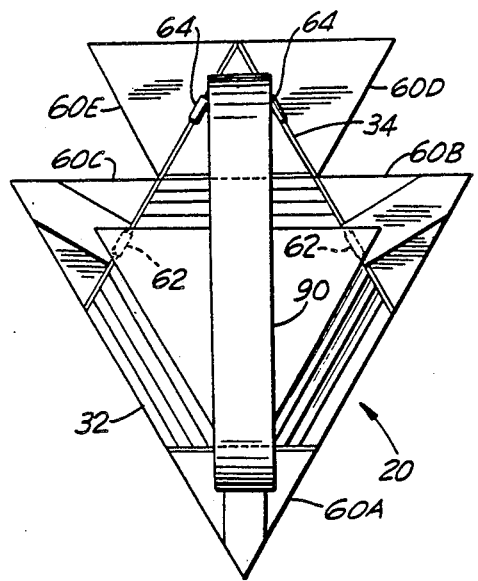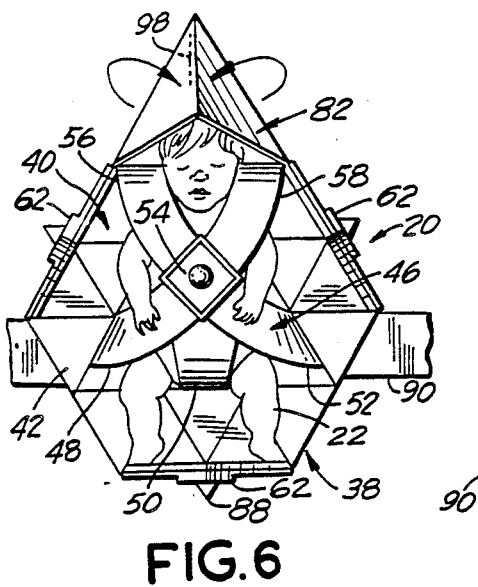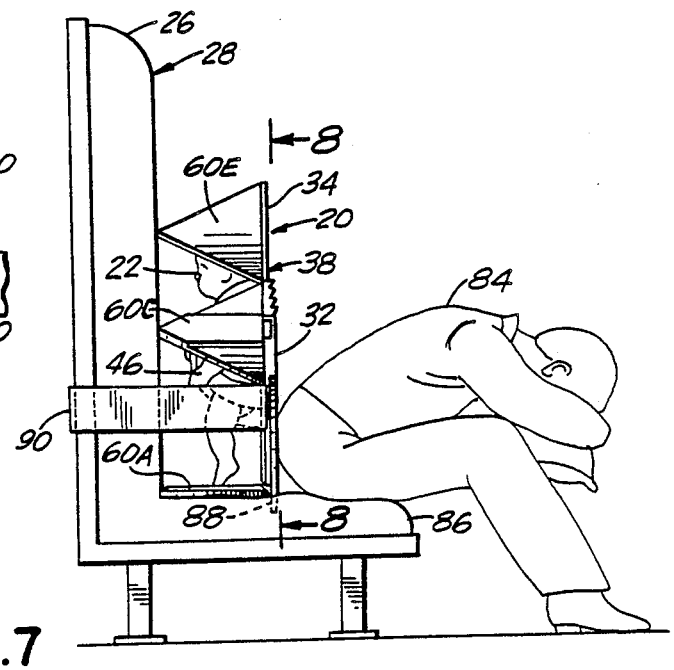

CHILD RESTRAINT

BACKGROUND OF THE INVENTION

This invention relates to a restraint for a child to facilitate holding the child in a position wherein the child may eat or rest comfortably, as well as permitting deployment of the restraint to protect the child during vehicular transportation and, more particularly, to a construction of such restraint in a manner which allows the restraint, during periods of non-use, to be folded into a relatively small package which is readily carried about and is readily stored.

Child restraints are employed frequently for holding a child in a position convenient for feeding. Typically, a restraint may be used also during vehicular travel, such as in an automobile or an aircraft, for holding the child in a position wherein the child can sleep comfortably without placing any undue burden on the part of a parent holding the child and the restraint in the parent's lap.

Typically, in the construction of a child restraint, there is some form of rigid support which holds the child, and some form of harness which secures the child to the support. Thereby, when the child and restraint are held in the parent's lap, the restraint prevents the child from jumping out of the lap.

The child restraint is also used, particularly, in vehicular transportation, to protect the child in the event of a rapid deceleration or possible crash of the vehicle. It is common practice in the construction of restraints employed for protecting children to secure the rigid support to a seat in the vehicle as by use of a seat belt or other suitable strap. A restraint designed primarily for protecting the child from a crash may have a different construction from a restraint which is intended merely to facilitate a feeding of the child.

There are other restraints which are constructed without rigid supports, these restraints being formed primarily of webbing. The webbing-form of restraint has, as a primary benefit, the facility to be folded into a small package which is readily carried about and stored during periods of time when the restraint is not needed for the child.

A problem arises in that none of these restraints have all of the foregoing desired features, namely, the capacity to hold a child comfortably in a parent's lap and the capacity to be secured to a vehicular seat for protecting the child, and the facility to be folded into a compact package. Therefore, it has been necessary to make compromises in the selection of a suitable restraint for a child.

SUMMARY OF THE INVENTION

The aforementioned problem is overcome and other advantages are provided by a child restraint which, in accordance with the invention, is provided with a support element suitable for holding the child, and a harness of a plurality of belt segments for securing the child to the support element. A strap of adjustable length is provided for securing the support element to the lap of the child restraint, the strap also serving to secure the support element alternatively to the back of a vehicular seat.

As a further feature of the invention, a plurality of wing panels are secured in pivotal manner about a periphery of the support element. Pivoting of the wing panels is accomplished by hinges which may be locked in any one of a plurality of positions. In a preferred embodiment of the child restraint, the support element is constructed as a flat rigid base member covered with padding on a front surface thereof facing the child. The wing panels are constructed similarly in rigid fashion and are covered with padding on their surfaces which face the child. In a first lockable position of each of the hinges, the wing portions are oriented coplanar with the support element so as to serve for enlarging the usable area of the support panel. In this configuration, the restraint has the configuration of a flat roomy bed which is comfortable for holding the child both during feeding and for allowing the child to sleep.

The hinges are also lockable in a position wherein the wing panels are oriented perpendicular to the support element in the manner of wall segments which surround the child. In this configuration, a wing at the bottom of the support element projects beneath the feet of the child, two wing panels respectively on the right and the left sides of the support element alongside the upper torso of the child serve as protective sidewalls, and two wing panels on the left and the right sides of the head of the child aid in protecting the child's head. Preferably, the hinges of the wing panels alongside the child's head provide for a locking of the wing panels in an attitude wherein the wing panels lean towards each other to form an enclosure, or helmet for protection of the child's head. All of the wing panels have a triangular shape which facilitates a folding of the restraint and, in the case of the wing panels which protect the head, the triangular configuration allows for a mating of the panels to provide for the protective helmet.

The configuration of the restraint wherein the wing panels are directed forward of the flat rigid base member is ideally suited for placement of the restraint in a vertical position facing the back of a vehicular seat for protecting the child from rapid deceleration or possible crash. The strap which is usually employed for securing the support element to the parent's lap is reattached to the support element to urge the support element towards the seat back and provide pressure of pointed termini of the wing panels against the seat back. In the vertical orientation, the child can stand upon the bottom wing panel while the side wing panels protect the upper portion of the torso from possible flying objects, as may become dislodged in an aircraft or automobile crash, and the two topmost wing panels form a helmet in conjunction with a top portion of the support element to protect the child's head from flying objects. All of the wing panels, by extending forward of the support element, establish a predetermined spacing between the support element and the seat back which protects the child from any possible crushing as might occur if a person is thrown towards the seat back or in the event of a crash.

To accomplish the folding of the child restraint into a compact package, the support element is articulated by means of a hinge at a location corresponding approximately to the position of the child's neck. The hinge divides the support element into a base panel which holds the child's torso, legs, and arms, and a flap panel which supports the child's head. This hinge, as is the case with the aforementioned hinges, can be locked in a plurality of positions, one of which provides for coplanar orientation of the flap panel with the base panel, and a second position which allows for a folding of the flap panel forward and downward to rest against the base panel.

The base panel has six edges arranged in an approximately hexagonal configuration, the top edge of the base panel being hinged to the flap panel. The two wing panels which protect the child's head are hinged to sides of the top panel, the flap panel having a triangular configuration. During a folding of the restraint, the flap panel with its wing panels coplanar therewith are folded down to press against the base panel, the assembly of the flap panel with its two wing panels extending approximately half-way across the base panel. Thereupon, the two wing panels which protect the upper torso are folded inwardly about their respective hinges to lie on top of the wing panels which protect the child's head. Also, the wing panel which engages with the child's feet is folded inwardly to rest against a bottom portion of the base panel. The foregoing folding reduces the overall perimeter of the restraint to the edges of the base panel so as to provide a compact configuration of the restraint in the fashion of a package which is readily carried about and which is readily stored.

BRIEF DESCRIPTION OF THE DRAWING

The aforementioned aspects and other features of the invention are explained in the following description, taken in connection with the accompanying drawing wherein:

FIG. 4 is a rear view of the restraint with the restraint disposed in the configuration of FIG. 3, there being a strap fixed to the support element with a vertical attitude suitable for enveloping the legs of the person of FIG. 3;

FIG. 5 shows the restraint in perspective view, and partially diagrammatically, to indicate a mode of holding of wing panels inwardly about the child by means of hinges located at regions of the support element;

FIG. 6 shows a front view showing of the child restraint with the wing panels directed inwardly about a child supported within the restraint, the figure showing a pair of wing panels inclined inwardly to envelop the child's head in the manner of a protective element, the view showing also portions of a strap fixed in a transverse attitude to the support element for securing the restraint to the back of a chair or vehicular seat;

FIG. 7 is a side elevation view of a chair, such as an aircraft seat, with the child and the restraint being oriented vertically and standing upon the seat bottom, the strap securing the restraint to the seat back with the wing panels being urged against the chair back;

DETAILED DESCRIPTION

Figure 13:
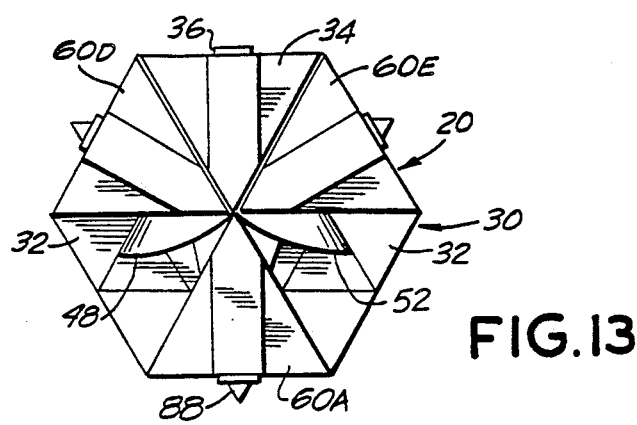
FIG. 13 is a plan view of the child restraint folded together in a compact package.

With reference to the drawing figures, there is shown a child restraint 20. In accordance with the invention, the restraint 20 is suitable for carrying a child 22 in a person's lap 24 (FIG. 3), is adaptable to be secured to the back 26 of a chair 28 such as an airline seat (FIG. 7) during a crash landing, and during periods of nonuse can be folded into a compact package 30 (FIG. 13). These features of the invention are attained by the following construction.

The restraint 20 comprises a base 32 and a flap 34 which are secured to each other pivotally by a hinge 36. The base 32 is in the form of a rigid hexagon member and the flap 34 is in the form of a rigid triangular panel. A suitable material for their construction being a plastic material. The hinge 36 allows the base 32 and the flap 34 to be disposed relative to each other in a coplanar configuration (FIGS. 1-8), or in a folded configuration (FIG. 13) wherein the flap 34 is folded over against the base 32. The hinge 36, as will be described more fully with reference to a description of a hinge in FIGS. 9-12, includes means for locking the hinge so as to lock the base 32 and the flap 34 in the coplanar configuration as well as for locking the base 32 and the flap 34 in the folded configuration. In the coplanar configuration of the base 32 and the flap 34, the base 32 and the flap 34 constitute a flat rigid element which serves as a bed or support 38 for holding the child 22 in both the horizontal position of FIG. 3 and the vertical position of FIG. 7. To insure comfort for the child 22, a front surface of the support 38, facing the child, is covered with a padding 40. The padding 40 consists of a pad 42, secured to the base 32 by conventional means such as by an adhesive (not shown), and a separate pad 44 secured similarly to the flap 34.

A harness 46 (FIGS. 1, 3, and 6) secures the child 22 to the base 32. The harness 46 is formed of three belt segments 48, 50, and 52 which are secured permanently at their distal ends through the pad 42 to the base 32 by conventional means such as by an adhesive, by stitching or by clamping (not shown). The proximal ends of the belt segments 48, 50, and 52 are joined permanently at an adjustable buckle 54 located generally in a central position in front of the base 32 and centered on the child's torso. The belt segment 48 secures the right side of the child's torso, the belt segment 50 passes between the child's legs to secure the bottom central portion of the child's torso, and the belt segment 52 secures the right side of the child's torso. The harness 46 further includes a belt segment 56 which passes over the child's right shoulder to secure the upper right quadrant of the child's torso, and a belt segment 58 which passes over the child's left shoulder to secure the upper left quadrant of the child's torso. The distal ends of the belt segments 56 and 58 are secured permanently, in the same manner as the belt segment 48, to the base 32. The proximal ends of the belt segments 56 and 58 can be latched and unlatched to the buckle 54. Latching of the belt segments 56 and 58 to the buckle 54 secures the child within the harness 46 to the base 32. Unlatching of the belt segments 56 and 58 from the buckle 54 serves to open the harness 46 to facilitate emplacement of the child within the harness 46 and removal of the child from the harness 46.

In accordance with a further feature of the invention, the restraint 20 further comprises a set of wings 60A-E secured pivotally to peripheral edges of the support 38. Three of the wings, 60A, 60B, and 60C are secured to the base 32 by hinges 62, and the remaining two wings 60D and 60E are secured to the flap 34 by hinges 64. The hinges 62 and 64 are constructed in a manner similar to that of the hinge 36 in that these hinges provide for locking the wings 60A-E in a coplanar configuration with the support 38, and for a locking of the wings 60A-C in a folded configuration against the base 32 in the formation of the compact package 30 of FIG. 13. As will be described subsequently with reference to FIGS. 9-12, the hinges 62 have a third locking position for securing the wings 60A-C in an attitude perpendicular to the base 32. The hinges 64 also provide for plural locking positions, the construction of the hinges 64 providing for a locking of the wings 60D and 60E in a position of forward extension from the flap 34 and leaning inwardly towards each other (FIG. 6) for maximizing protection of the child's head, as in an aircraft crash-landing situation. In the description of the child restraint 20, it may be convenient to describe the wings 60D-E as upper wings, the wings 60B-C as lower wings, and the wing 60A as a bottom wing. However, it is to be understood that the terms "upper" and "lower" or "top" and "bottom" are for purposes of convenience only, and do not refer to a specific orientation of the restraint 20 in view of the fact that the restraint 20 may be positioned in any number of orientations.

The base 32 is formed with six sides in a generally hexagonal shape. The flap 34 has the shape of a triangle, the triangle being approximately equilateral. Also, each of the wings 60A-E is constructed in the shape of a triangle, the triangles being approximately equilateral. The hexagonal and equilateral shapes enable the folding of the restraint 20 into the compact package 30 of FIG. 13.

The wings 60A-E are constructed of rigid panels, in the same manner as the construction of the flap 34, and are covered, preferably on their respective front surfaces facing the child 22, with pads 66 which provide further comfort and security for the child. All of the pads 42, 44, and 66 may be constructed of a foamed plastic material, such as polyethylene, having sufficient resilience to provide for both comfort and safety. The pads 66 are secured to the panels of their respective wings 60A-E in the same fashion as described above in the securing of the pad 44 to the flap 34.

The locking of the flap 34 to the base 32 in the coplanar configuration constitutes a preferred embodiment of the invention. However, the coplanar configuration is understood to include an alternative construction (not shown) in which the flap 34 is inclined slightly from the plane of the base 32 to elevate the child's head, if desired. Similarly, the parallel or coplanar orientation of the wings 60A-E is understood to include an alternative embodiment (not shown) wherein the wings 60A-E may be oriented with a slight inclination to the plane of the base 32. The parallel and slightly inclined orientations may be referred to collectively as substantially parallel.

Figure 10:
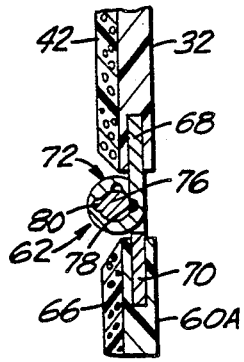
FIG. 10 is a sectional view, taken along the line 10—10 in FIG. 9, showing details in the construction of a hinge securing the wing panel to the base panel, the two panels being coplanar in FIGS. 9 and 10.
Figure 11:
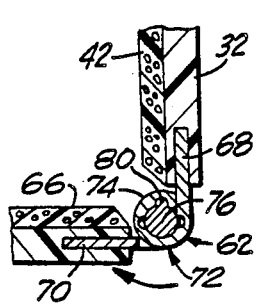
FIG. 11 shows a sectional view of the two panels corresponding to the view of FIG. 10, but depicting the two panels in a configuration wherein the wing panel is pivoted to be perpendicular to the base panel.
Figure 12:
FIG. 12 is a view similar to that of FIG. 11, but showing the two panels folded against each other.

The hinges 36, 62, and 64 embody the same principal of construction to be described now with respect to a hinge 62 shown in FIGS. 9-12. As disclosed above, the hinges 62 have the capacity to lock in three different positions, one providing for the coplanar configuration of the wing 60A and the base 32 (FIGS. 9 and 10), a second locking position providing for a perpendicular orientation of the wing 60A relative to the base 32 (FIG. 11), and the third locking position providing for a folding of the wing 60A against the base 32 (FIG. 12).

With reference to the sectional views of FIGS. 10-12, the first locking position may be regarded as a locking at 0° of pivot, the second locking position may be regarded as a locking at 90° of pivot, and the third locking position may be regarded as a locking at 180° of pivot. The hinge 62A comprises a first leg 68 and a second leg 70 which are joined together by a pivot 72. The pivot 72 comprises a sleeve 74 and a pin 76 disposed within the sleeve 74. The sleeve 74 is integrally formed with the leg 68, and the pin 76 is integrally formed with the leg 70. The locking mechanism of the hinge 62 is provided by a plurality of recesses 78 disposed along an inner surface of the sleeve 74, and a tab 80 extending radially outward from the pin 76. The recesses 78 are positioned at 90° increments about an axis of the pivot 72 for engagement with the tab 80 at any one of a plurality of tab positions.

In the construction of the hinge 62, the leg 68 can be moved sideways relative to the leg 70 along the pivot axis to free the tab 80 from a recess 78, this being the unlocked position of the hinge 72, to allow the legs 68 and 70 to pivot freely relative to each other. Upon selection of a locking position of the hinge 62, the leg 68 is then translated back relative to the leg 70 along the pivot axis to engage the tab 80 within the recess. This accomplishes the locking of the hinge 62 in the desired locking position. The hinge 64 is similar in construction to the hinge 62 except that normally two locking positions are required, one at 0° at pivot and the second at approximately 110° of pivot, the precise location of the second locking position being determined experimentally based on the thickness and resiliency of the pads 66 of the wing 60D and 60E. The hinge 36 requires locking positions only at 0° of pivot and 180° of pivot. Alternatively, if desired, the pin 76 may be provided with an outer surface in the form of a spline (not shown) for mating with a similarly configured interior surface (not shown) of the sleeve 74 to provide a multiple-locking position hinge suitable for use at the locations of any one of the hinges 36, 62, and 64. A ratchet mechanism could also be used within the hinge to control its manipulation in the various angular positions.

FIG. 5 demonstrates pivoting of the wings 60A-E relative to the support 38, so as to convert the restraint 20 from a flat bed-shaped restraint to a restraint formed in the manner of an enclosure wherein the wings 60A-E serve as walls upstanding from the support 38 to protect the child 22. The wings 60A, 60B, and 60C, in their upstanding positions, serve as protective walls about the legs and the upper torso of the child. The inward inclination of the wings 60B and 60E about the flap 34 (FIG. 6) form a helmet 82 which protects the child's head. As shown in FIG. 7, wherein the restraint 20 is mounted to the chair 28, an outer corner of each of the wings 60A-E contacts the back 26 of the chair 28. The wing 60A at the bottom of the support 38 serves as a foot rest for holding the legs of the child 22. The wings 60B-C, located opposite the shoulders of the child, protects the upper portion of the child's torso from flying objects which may be present during a crash-landing, and the helmet 82 protects the head of the child from such flying objects. All of the wings 60A-E establish a minimum spacing between the support 38 and the chair back 26 so as to prevent a crushing of the child by a person 84 sitting on the front edge of the bottom 82 of the chair 28. It is noted that the outer points or corners of the wings 60A-E, by engaging with the chair back 26, aids in a gripping of the chair 28 to prevent any possible sliding of the restraint 20 about the chair as might occur during a transverse acceleration of an aircraft. Also, it is noted that a part of the base 32 extends in a point 88 beyond the hinge 62 at the junction of the wing 60A with the base 32 (FIGS. 2, 6, 7, and 8) at the back side of the restraint 20; the point 88 engages in the chair bottom 86 (FIG. 7) to secure further the restraint 20 against lateral acceleration of the aircraft.

Figure 2:
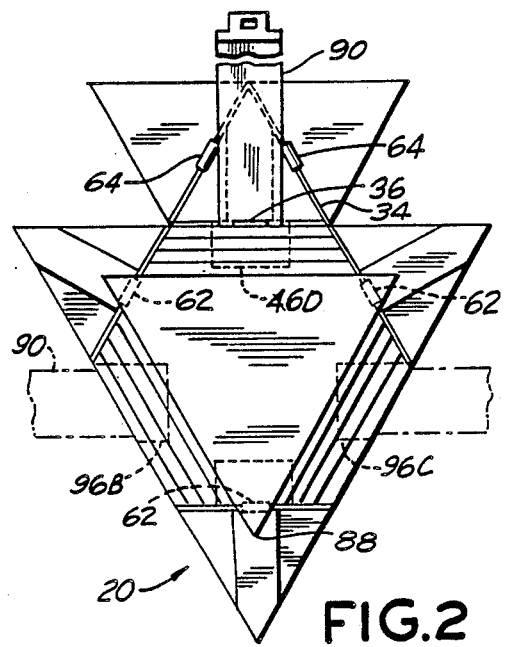
FIG. 2 is a rear view of the child restraint in the configuration depicted in FIG. 1.
Figure 3:
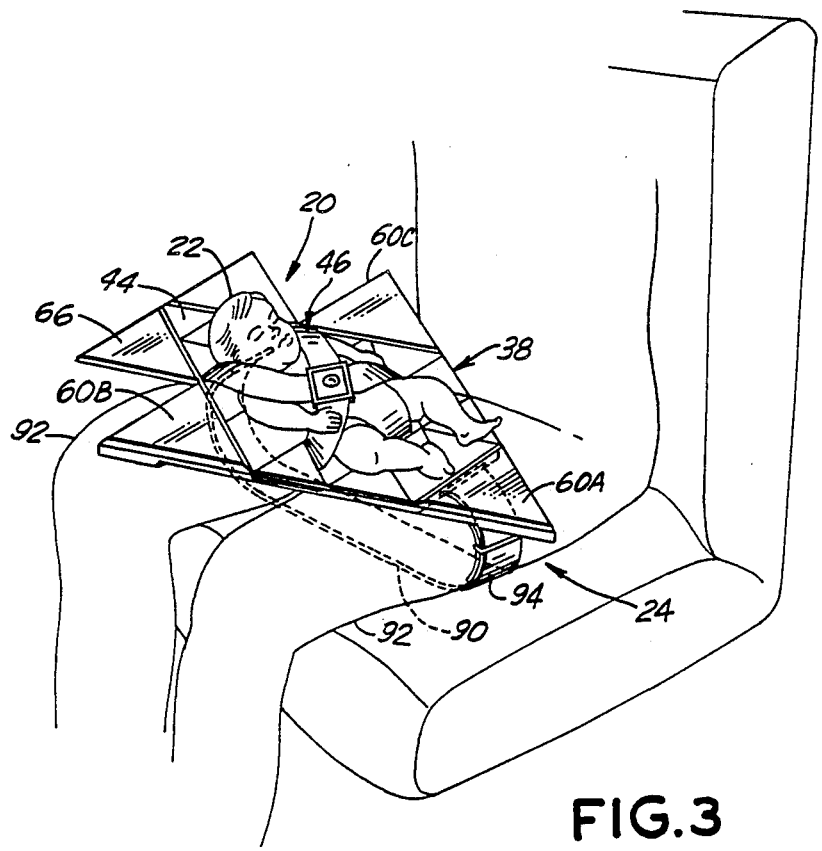
FIG. 3 is a stylized view showing the restraint of FIG. 1 secured by a strap to the lap of a person, the restraint supporting a child secured to the support element of the restraint by a harness.
Figure 8:
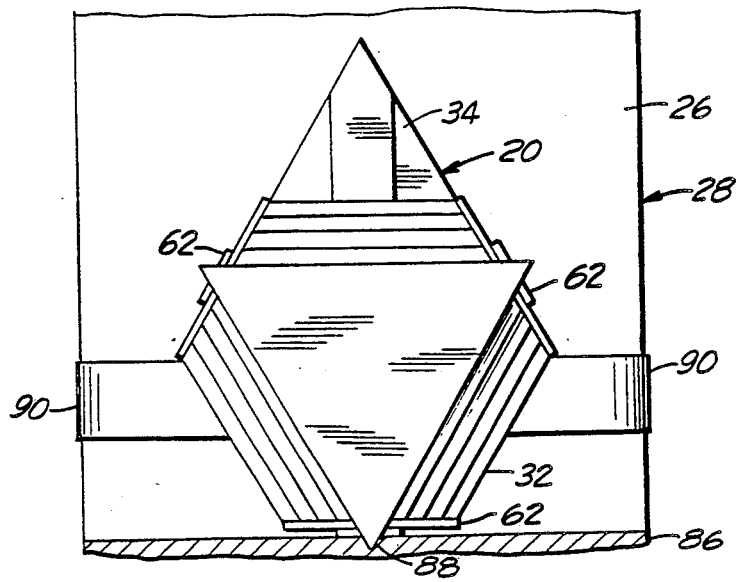
FIG. 8 is a rear view of the child restraint taken along the line 8—8 of FIG. 7.
Figure 9:
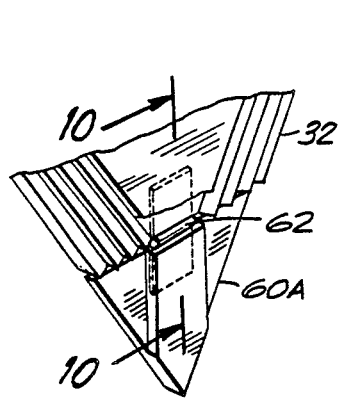
FIG. 9 is a fragmentary view showing a connection of the wing panel at the bottom edge of the base panel.

A strap 90 can be attached to the base 32 in either a longitudinal orientation of the restraint 20 (FIGS. 3 and 4), or on a transverse orientation of the restraint (FIGS. 6, 7, and 8). The strap 90 is attached to the base 32 in the longitudinal configuration for securing the restraint 20 about a person's legs 92 for holding the restraint 20 and the child 22 conveniently and comfortably on the person's lap (FIG. 3). The strap 90 is attached to the base 32 in the transverse position for securing the restraint 20 to the chair back 26 (FIG. 7) to hold the restraint 20 and the child 22 in the aforementioned position of security against aircraft deceleration. The strap 90 includes a length-adjustment device 94 (FIG. 5) for adjusting the length to fit the persons lap (FIG. 3) or the seat back (FIG. 7). Anchors 96A-D are embedded within four of the six sides of the base 32, as shown in FIG. 2, for securing ends of the strap 90. The anchors 96A and 96D are employed for attaching the strap 90 in the longitudinal direction of the restraint, and the anchors 96B and 96C are employed for attaching the strap 90 in the transverse direction of the restraint 20. As a further convenience in the use of the restraint 20, and as a further security feature, a zipper 98, indicated in phantom in FIG. 6, may be provided along abutting edges of the upper right wing 60D and the upper left wing 60E. The abutting edges of these two wings are indicated at 100 and 102, respectively, in FIG. 1. The zipper 98 gives additional strength to the helmet 82.

Figure 1:
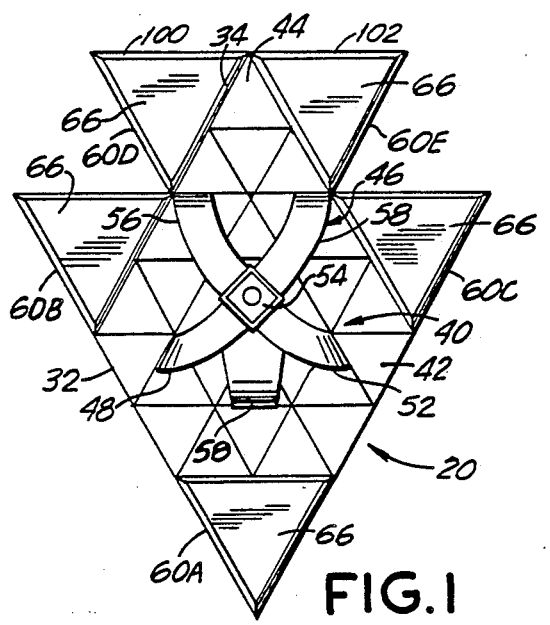
FIG. 1 is a plan view of the child restraint of the invention with wing panels extending in coplanar orientation to the support element of the restraint.

To accomplish the folding of the restraint 20 into the compact package 30 of FIG. 13, the wings 60D and 60E are pivoted to the coplanar orientation with the flap 34 and locked in this orientation (FIG. 1). Thereupon, the flap 34 is folded about the hinge 36 to lie flat against the base 32. This brings side edges of the wing 60D and 60 in registration with the pivot axes of the hinges 62 which join respectively the wings 60B and 60C with the base 32. Thereupon, the wings 60B and 60C are folded over on top of the wings 60D and 60E. Finally, the wing 60A is folded against the base 32 to give the configuration shown in FIG. 13.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A child restraint comprising:
    a support element having a generally planar form;
    a harness for securing a child to a front surface of said support element;
    a plurality of panels configured as wings extending from peripheral regions of said support element;
    hinge means for pivotally connecting respective ones of said wings in a first selectable fixed orientation and in a second selectable fixed orientation relative to said support element, said wings being substantially parallel to said support element in said first orientation and upstanding from said support element in said second orientation, said wings serving as extensions of said support element during said substantially parallel orientation, said wings serving as wall members to partially enclose the child in said upstanding orientation; and
    means for securing said support element to a seat back with the front surface of the support element facing the seat back, said securing means holding the wall members during said upstanding orientation in abutment against the seat back, said wall members establishing a predetermined spacing between said support element and the seat back, said wall members in cooperation with said support element and the seat back forming a secure region for protection of the child.

2. A restraint according to claim 1 wherein said support element comprises a base panel and a flap panel, said hinge means pivotally connecting said flap panel to said base panel to accomplish a folding of said flap panel against said base panel.

3. A restraint according to claim 2 wherein said hinge means allows for a folding of selected ones of said wings against said base panel, two of said wings being upper wings secured to said flap panel on opposite sides of a center line of said flap panel, a third and a fourth of said wings being lower wings secured to said base panel on opposite sides of a center line of said base panel, there being a fifth one of said wings secured to a bottom side of said base panel opposite said flap panel; and wherein
    said restraint being foldable into a compact configuration wherein said flap panel is folded against said base panel with said two upper wings lying flat against said base panel, said two lower wings are folded against said base panel and said bottom wing is folded against said base panel.

4. A support according to claim 3 wherein said hinge means include a plurality of hinges disposed along peripheral edges of said base panel and said flap panel, each of said hinges including means for locking said hinge in a plurality of selectable positions.

5. A restraint according to claim 1 further comprising a strap assembly for securing said restraint to an external object, said strap assembly including a strap and adjustment means for adjusting a length of the strap for encircling the external object.

6. A restraint according to claim 5 further comprising means for securing said strap assembly in a plurality of orientations relative to said support element, one of said orientations being a longitudinal orientation suitable for securing said restraint to an external object in the form of a person's lap, and a second of said orientations being a transverse orientation suitable for securing said restraint to an external object in the form of a seat back.

7. A restraint according to claim 6 further comprising first and second anchor means disposed on a left side and a right side, respectively, of said support element in said transverse orientation, there being third and fourth anchors located at top and bottom portions of said support element for securing opposite ends of the strap in said longitudinal orientation.

8. A restraint according to claim 1 wherein a first and a second of said wings are connected to said support element on an upper right side thereof and an upper left side thereof adjacent a location of said support element designated for holding a head of the child; and said first and said second wings are pivotal inwardly towards each other by said hinge means to form a helmet.

9. A restraint according to claim 8 further comprising a harness for securing the child to said support element, said harness comprising a buckle and a first plurality of belt segments secured between edge regions of said support element and said buckle, there being a second plurality of belt segments secured to sections of said support element distant from said first plurality of belt segments, the belt segments of said second plurality of belt segments having free ends to engage with said buckle.

10. A restraint according to claim 1 further comprising:

a strap assembly for securing said restraint to an external object, said strap assembly including a strap and adjustment means for adjusting a length of the strap for encircling the external object;

means for securing said strap assembly in a plurality of orientations relative to said support element, one of said orientations being a longitudinal orientation suitable for securing said restraint to an external object in the form of a person's lap, and a second of said orientations being a transverse orientation suitable for securing said restraint to an external object in the form of a seat back;

a first and a second of said wings are connected to said support element on an upper right side thereof and an upper left side thereof facing a location of said support element designated for holding the head of the child; and wherein said first and said second wings are pivotal inwardly towards each other by said hinge means to form a helmet; and a third and a fourth of said wings are connected to opposite sides of said support element facing a location of said support element designated for holding the child's body, there being a fifth one of said wings connected to a bottom edge of said support element for engagement with the child's feet;

each of said wings projects forward of said support element during a securing of said restraint to the seat back, each of said wings having a generally triangular shape with a corner for contacting the seat back during a securing of said restraint to the seat back, said strap in the transverse orientation urging said wings against said seat back, said wings establishing a distance between said support element and the seat back to define a secure region for the child.

11. The child restraint comprising:
a base panel for supporting a child;
a lower right wing panel connected to a right side of said base panel;
a lower left wing panel connected to a left side of said base panel;
a protector assembly connected to said base panel for protecting the head of the child, said protector assembly comprising a central flap panel connected to said base panel and serving as an extension of said base panel, said protector assembly further comprising an upper right wing panel connected to a right side of said flap panel and an upper left wing panel connected to a left side of said flap panel;

hinge means for pivoting respective ones of said wing panels selectively using one of a plurality of selectable fixed orientations relative to a plane of said base panel, a wing panel in a first of said fixed orientations serving as an extension of said base panel and, in a second of said fixed orientations, serving as a wall for partially enclosing the child;

a harness including a buckle positioned above a portion of the child's body, the harness further comprising a plurality of belt segments directed radially outward from the buckle and engaging said base at spaced-apart locations for securing the child to said base panel, at least one of said belt segments being detachable from said buckle to facilitate insertion of the child between said harness and said base panel; and a strap assembly detachably securable in either a transverse or a longitudinal direction of said base panel, the longitudinal direction allowing a securing of said restraint with the child therein to a person's lap, the transverse direction allowing a securing of said restraint with the child therein to the back of a seat with said wings serving as walls to space said base panel in a predetermined distance from the seat back.

12. A restraint according to claim 11 further comprising a bottom wing panel extending from a bottom side of said base panel and being pivotally connected to said base panel by said hinge means, said bottom wing panel being pivotal selectively to any one of a plurality of selectable fixed orientations relative to a plane of said base panel, said bottom wing panel in a first of said fixed orientations serving as an extension of said base panel said bottom wing panel in a second of said fixed orientations serving as a wall for engaging with the child's feet.

13. A restraint according to claim 12 wherein said hinge means includes a plurality of hinges joining said base panel to said lower right wing panel and to said lower left wing panel and to said bottom wing panel, and joining said flap panel to said upper right wing panel and to said upper left wing panel; and said base panel includes a point extending beyond the hinge joining said base panel to said bottom wing panel for contacting a bottom of the seat during a securing of said restraint to the seat back.

14. A restraint according to claim 11 wherein said hinge means comprises hinges located at the junctions in said protector assembly between said flap panel and said upper right wing panel and said upper left wing panel, said hinges including means for locking said upper right and said upper left wing panels leaning towards each other to form with said flap panel a helmet for protecting the child's head.

15. A restraint according to claim 11 wherein each of said wing panels has a triangular shape.

16. A restraint according to claim 15 wherein said base panel and said protector assembly are provided with padding disposed on surfaces of said base panel and said protector assembly facing the child.

17. A restraint according to claim 15 wherein said hinge means includes a hinge connecting the flap panel of said protector assembly with said base panel to permit a folding of said flap panel towards said base panel.

18. A restraint according to claim 17 wherein said hinge means allows for a folding of selected ones of said wing panels against said base panel, said restraint further comprising a bottom wing panel secured to a bottom side of said base panel opposite said flap panel; and said restraint is foldable into a compact configuration wherein said flap panel is folded against said base panel with said two upper wing panels lying against said base panel, said two bottom wing panels are folded against said base panel, and said bottom wing panel is folded against said base panel.

19. A restraint according to claim 17 wherein said hinge means further comprises hinges joining said flap panel to said upper right wing panel and to said upper left wing panel, and further hinges joining said base panel to said lower right wing panel and to said lower left wing panel; and each of said hinges including means for locking each hinge in a plurality of selectable positions.

* * * * *